United States Patent
Yu

(10) Patent No.: US 9,110,648 B2
(45) Date of Patent: Aug. 18, 2015

(54) POWER SUPPLY CIRCUIT TO SIMULATE BATTERY POWER

(71) Applicants: Fu Tai Hua Industry (Shenzhen) Co., Ltd., Shenzhen (CN); HON HAI PRECISION INDUSTRY CO., LTD., New Taipei (TW)

(72) Inventor: Qi-Long Yu, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 207 days.

(21) Appl. No.: 13/896,338

(22) Filed: May 17, 2013

(65) Prior Publication Data
US 2013/0326241 A1    Dec. 5, 2013

(30) Foreign Application Priority Data
May 30, 2012    (CN) .......................... 2012 1 1722754

(51) Int. Cl.
*H02M 3/158*    (2006.01)
*G06F 1/26*    (2006.01)
*G06F 11/24*    (2006.01)

(52) U.S. Cl.
CPC . *G06F 1/26* (2013.01); *G06F 11/24* (2013.01)

(58) Field of Classification Search
CPC .... H02M 3/156; H02M 3/158; H02M 3/1588
USPC .................................... 323/271, 282; 361/18
See application file for complete search history.

(56) References Cited

U.S. PATENT DOCUMENTS

| | | | |
|---|---|---|---|
| 2006/0220625 A1* | 10/2006 | Chapuis ........................ | 323/282 |
| 2007/0090818 A1* | 4/2007 | Nishimori ..................... | 323/282 |
| 2007/0104304 A1* | 5/2007 | Takahashi ..................... | 375/375 |
| 2007/0120547 A1* | 5/2007 | Tateishi et al. ................ | 323/282 |
| 2008/0218142 A1* | 9/2008 | Uehara ......................... | 323/282 |
| 2010/0253303 A1* | 10/2010 | Chern et al. .................. | 323/282 |
| 2012/0026762 A1* | 2/2012 | Nguyen et al. ................ | 363/49 |
| 2013/0326241 A1* | 12/2013 | Yu ................................ | 713/300 |
| 2014/0266118 A1* | 9/2014 | Chern et al. .................. | 323/283 |

* cited by examiner

*Primary Examiner* — Jeffrey Sterrett
(74) *Attorney, Agent, or Firm* — Novak Druce Connolly Bove + Quigg LLP

(57) ABSTRACT

A power supply circuit includes a power output port, an operational amplifier, a voltage adjusting circuit, a feedback circuit, and a current controlling circuit. The power output port connects with an electronic device under test and provides a power supply which in all respects simulates the behavior of a battery being discharged as it supplies working power, the circuit also mimics the behavior of a battery in testing the battery-recharging abilities of the electronic device.

14 Claims, 2 Drawing Sheets

POWER SUPPLY CIRCUIT TO SIMULATE BATTERY POWER

BACKGROUND

1. Technical Field

The present disclosure relates to circuits, and particularly to a power supply circuit for simulating battery function.

2. Description of Related Art

Electronic devices, such as mobile phones and tablet computers usually include a number of functioning parts, such as a processor, a display, and software applications, and a battery to power these functioning parts. Usually, in order to guarantee the quality of the functioning parts, tests for the functioning parts are needed before the devices leaving the factory. However, during testing the functioning parts, a battery powering the functioning parts will be discharged and recharged quite a few times, which decreases the life of the battery.

A power supply circuit to overcome the described limitations is thus needed.

BRIEF DESCRIPTION OF THE DRAWINGS

Many aspects of the present disclosure are better understood with reference to the following drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

Embodiments of the present disclosure will be described with reference to the accompanying drawings.

Figure 1:
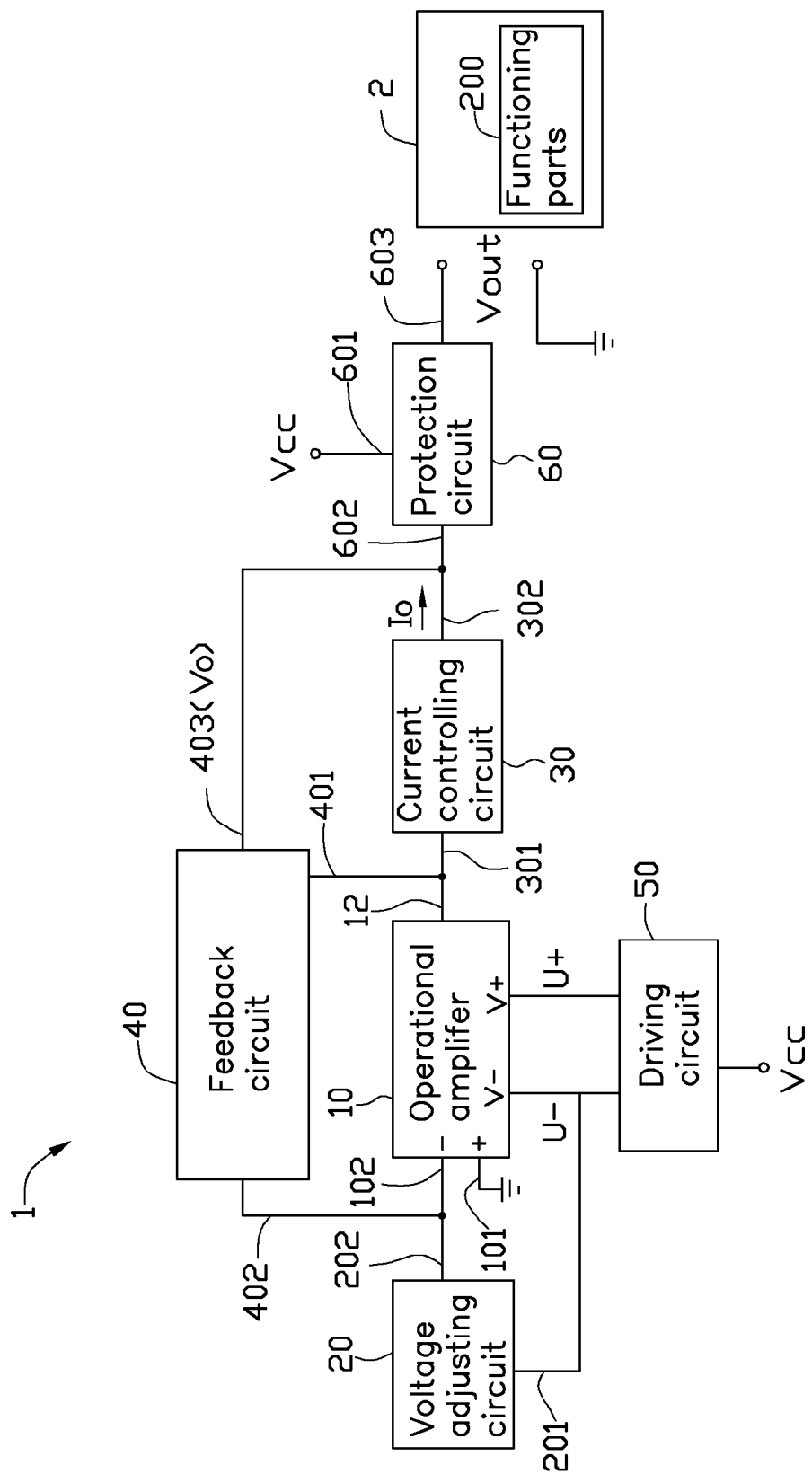
FIG. 1 is a block diagram of one embodiment of a power supply circuit to simulate battery power.

FIG. 1 illustrates a block diagram of a power supply circuit 1 to simulate battery power. Instead of using a battery, an electronic device 2 is powered by the power supply circuit 1 when functioning parts 200 of the electronic device 2 are being tested.

The simulating circuit 1 includes a power output port Vout, an operational amplifier 10, a voltage adjusting circuit 20, a current controlling circuit 30, a feedback circuit 40, and a driving circuit 50

The power output port Vout connects with the electronic device 2. The operational amplifier 10 is connected to the voltage adjusting circuit 20, the current controlling circuit 30, the feedback circuit 40, and the driving circuit 50.

The operational amplifier 10 includes a non-inverting input port 101, an inverting input port 102, a first output port 12, a positive driving port V+, and a negative driving port V−.

The non-inverting input port 101 is grounded. The voltage adjusting circuit 20 includes a voltage input port 201 and a voltage output port 202. The voltage input port 201 receives a reference voltage Vref, the voltage output port 202 is connected to the inverting input port 102 of the operational amplifier 10. The voltage adjusting circuit 20 converts the reference voltage Vref to an operational signal and provides the operational signal to the inverting input port 102 of the operational amplifier 10 via the voltage output port 202.

In the embodiment, the operational amplifier 10 outputs an electric signal according to the operational signal received by the inverting input port 102 of the operational amplifier 10.

The driving circuit 50 is connected to the positive driving port V+, the negative driving port V−, and a power voltage Vcc. The driving circuit 50 converts the power voltage Vcc to a positive voltage U+ and a negative voltage U−, and provides the positive voltage U+ and the negative voltage U− to the positive driving port V+ and the negative driving port V− respectively of the operational amplifier 10. In the embodiment, the operational amplifier 10 is in the working state when the positive driving port V+ and the negative driving port V− respectively receive the positive voltage U+ and the negative voltage U−. In the embodiment, the driving circuit 50 is a Buck-Boost conversion circuit, the positive voltage U+ output by the driving circuit 50 is greater than the power voltage Vcc and the negative voltage U− output by the driving circuit 50 is less than the power voltage Vcc. For example, the power voltage Vcc is 5 volts, the positive voltage U+ is 10 volts, and the negative voltage U− is −5 volts.

In the embodiment, the power voltage Vcc is provided by an external power source (not shown).

In the embodiment, the voltage input port 201 of the voltage adjusting circuit 20 is connected to the driving circuit 50 and receives the negative voltage U− from the driving circuit 50. The reference voltage Vref herein is the negative voltage U−.

The feedback circuit 40 includes a feedback input port 401, a feedback output port 402, and a second output port 403. The feedback input port 401 is electrically connected to the first output port 12 of the operational amplifier 10. The feedback output port 402 is connected to the inverting input port 102 of the operational amplifier 10. The feedback circuit 40 feeds back the electric signal output by the first output port 12 of the operational amplifier 10 to the inverting port 102 of the operational amplifier 10, and then forms a degenerative circuit. The feedback circuit 40 outputs a power supply voltage Vo to the power output port Vout based on the operational signal output by the voltage adjusting circuit 20.

The current controlling circuit 30 includes a control port 301 and a transmission port 302. The control port 301 is connected to the first output port 12, and the transmission port 32 is electrically connected to the power output port Vout. The current controlling circuit 30 outputs a power supply current Io to the power output port Vout according to the electric signal output by the first output port 12. In the embodiment, the power supply current Io provided to the output port Vout is not greater than a predetermined value due to the controlling carried out by the current controlling circuit 30.

Therefore, The feedback circuit 40 outputs the power supply voltage Vo and the current controlling circuit 30 outputs the power supply current Io to the power output port Vout, and then powers the functioning parts 200 of the electronic device 2. The power supply circuit 1 thus simulates a battery for powering the functioning parts 200 of the electronic device 2.

In the embodiment, the power supply circuit 1 also includes a protection circuit 60. The protection circuit 60 is connected between the feedback circuit 40 and the power output port Vout, and is also connected between the current controlling circuit 30 and the power output port Vout.

The protection circuit 60 includes a voltage driving port 601, a first conduction port 602, and a second conduction port 603. The voltage driving port 601 is electrically connected to the power voltage Vcc. The first conduction port 602 is connected to the second output port 403 of the feedback circuit 40 and the transmission port 302 of the current controlling circuit 30. The second conduction port 603 is electrically connected to the power output port Vout. The protection circuit 60 is used to establish a connection between the first conduction port 602 and the second conduction port 603, or cut off the connection between the first conduction port 602 and the second conduction port 603, according to state of the power voltage Vcc.

In detail, when the state of the power voltage Vcc is abnormal, such as the power voltage Vcc exceeding an allowable value, the protection circuit 60 cuts off the connection between the first conduction port 602 and the second conduction port 603, and thus cuts off connection between the second output port 403, the transmission port 302, and the power output port Vout. The power supply circuit 1 stops outputting the power supply voltage Vo and the power supply current Io via the power output port Vout. When the state of the power voltage Vcc is normal, the protection circuit 60 establishes the connection between the first conduction port 602 and the second conduction port 603, and thus establishes the connection between the second output port 403, the transmission port 302, and the power output port Vout. The power supply circuit 1 outputs the power supply voltage Vo and the power supply current Io to the power output port Vout, and then powers the functioning parts 200 of the electronic device 2.

Figure 2:
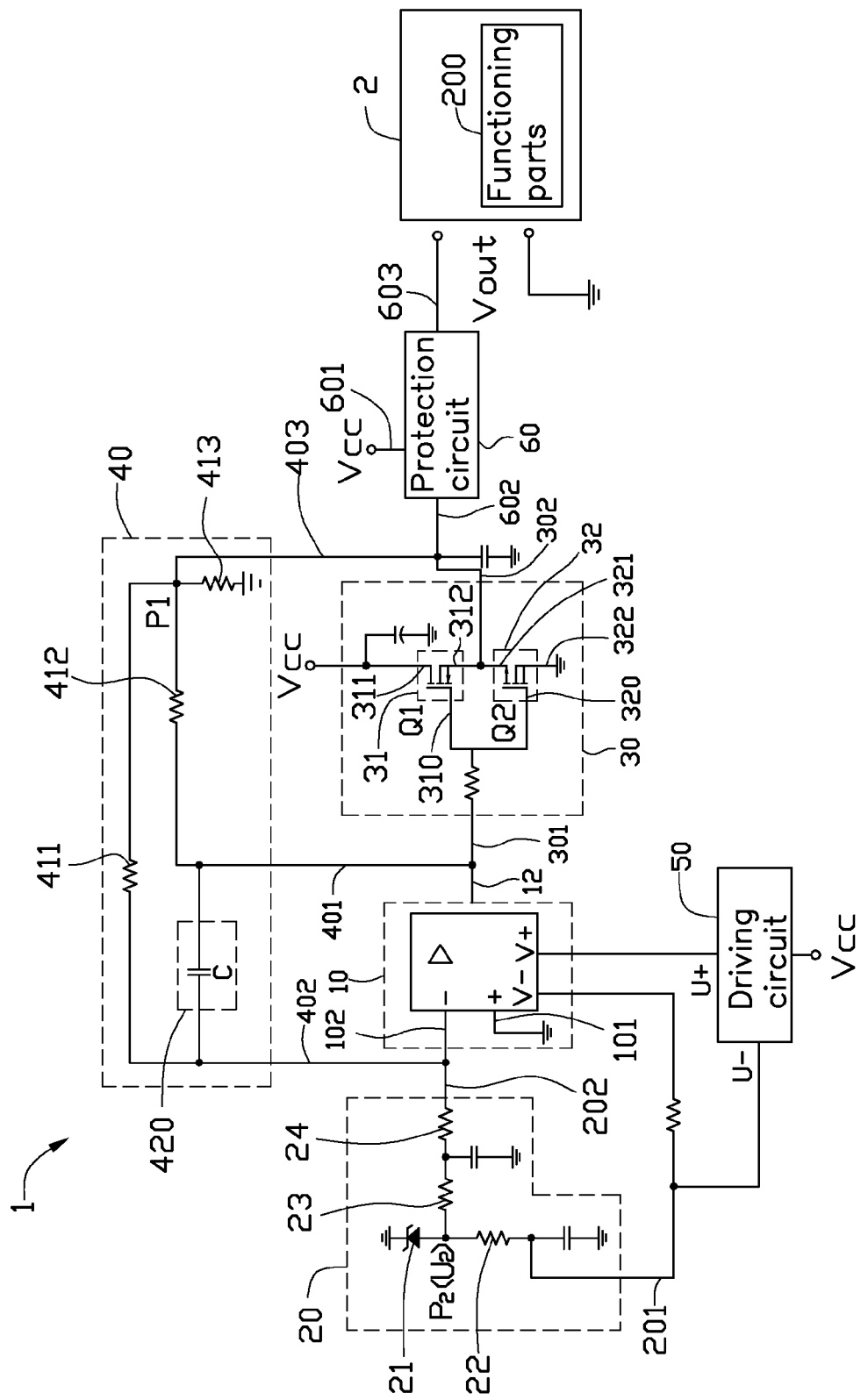
FIG. 2 is a circuit diagram of one embodiment of the power supply circuit of FIG. 1.

Referring also to FIG. 2, in the embodiment, the voltage adjusting circuit 20 includes a voltage regulator diode 21, a first voltage-dividing resistor 22, a second voltage-dividing resistor 23, and an input resistor 24. A cathode of the voltage regulator diode 21 is grounded, an anode of the voltage regulator diode 21 is electrically connected to the voltage output port 202 via the second voltage-dividing resistor 23 and the input resistor 24. The first voltage-dividing resistor 22 is connected between the anode of the voltage regulator diode 21 and the voltage input port 201. In another embodiment, the second voltage-dividing resistor 23 and the input resistor 24 can be replaced by a single resistor.

The feedback circuit 40 includes a first feedback resistor 411, a second feedback resistor 412, and a third feedback resistor 413. A connection node P1 of the first feedback resistor 411 and the second feedback resistor 412 constitutes the second output port 403, and a voltage of the connection node P1 is the power supply voltage Vo provided to the power output port Vout. The third feedback resistor 413 is connected between the second output port 403 and ground.

The feedback circuit 40 also includes a high frequency restraining circuit 420. The high frequency restraining circuit 420 is connected between the feedback input port 401 and the feedback output port 402, and restrains self-excited high frequency signals of the feedback input port 401 and the feedback output port 402. In the embodiment, the high frequency restraining circuit 420 includes a high frequency restraining capacitor C, and the high frequency restraining capacitor C is connected between the feedback input port 401 and the feedback output port 402. In the embodiment, the level of the capacitance value of the high frequency restraining capacitor C is in picofards (PF).

The current controlling circuit 30 also includes a first switch unit 31 and a second switch unit 32. The first switch unit 31 and the second switch unit 32 are electrically connected between the control port 301 and the transmission port 302. The control port 301 controls the first switch unit 31 and the second switch unit 32 to turn on or turn off. In detail, the control port 301 controls the first switch unit 31 to turn on and controls the second switch unit 32 to turn off at the same time. At this time, the first switch unit 31 outputs the power supply current Io to the transmission port 302. The control port 301 also controls the first switch unit 31 to turn off and controls the second switch unit 32 to turn on at the same time. At this time, any current flowing through the transmission port 302 is discharged to ground via the turned on second switch unit 32.

In the embodiment, the first switch unit 31 includes a first control terminal 310, a first input terminal 311, and a first output terminal 312. The first control terminal 310 is electrically connected to the control port 301, the first input terminal 311 is connected to the power voltage Vcc, and the first output terminal 312 is electrically connected to the transmission port 302.

The second switch unit 32 includes a second control terminal 320, a second input terminal 321, and a second output terminal 322. The second control terminal 320 is electrically connected to the control port 301, the second input terminal 321 is electrically connected to the transmission port 302, and the second output terminal 322 is grounded.

In the embodiment, the first switch unit 31 is an N-channel metal oxide semiconductor Field Effect Transistor (NMOSFET) Q1. A gate, a source, and a drain of the NMOSFET Q1 respectively constitute the first control terminal 310, the first input terminal 311, and the first output terminal 312 of the first switch unit 31. The second switch unit 32 is a P-channel metal oxide semiconductor Field Effect Transistor (PMOSFET) Q2. A gate, a source, and a drain of the PMOSFET Q2 respectively constitute the second control terminal 320, the second input terminal 321, and the second output terminal 322 of the second switch unit 32. A current flowing through the drains of the NMOSFET Q1 and the PMOSFET Q2 is the current flowing through the transmission port 302. The current able to flow through the drains of the NMOSFET Q1 and the PMOSFET Q2 is limited to a predetermined value, thus the current flowing through the transmission port 302 is also limited to the predetermined value.

When the functioning parts 200 of the electronic device 2 are being tested, the power output port Vout of the power supply circuit 1 is connected to the electronic device 2 and the power supply circuit 1 is in the working state to provide power to the functioning parts 200 of the electronic device 2.

The driving circuit 50 converts the power voltage Vcc to the positive voltage U+ and the negative voltage U−, and respectively outputs the positive voltage U+ and the negative voltage U− to the positive driving port V+ and the negative driving port V− of the operational amplifier 10. Thus, the operational amplifier 10 is driven to work.

The voltage adjusting circuit 20 receives the negative voltage U− from the driving circuit 50 via the power input port 201. The negative voltage U− is divided via the first voltage-dividing resistor 22, the second voltage-dividing resistor 23, and the input resistor 24. In the embodiment, the voltage regulator diode 21 regulates a voltage of a connection node P2 between the first voltage-dividing resistor 22 and the second voltage-dividing resistor 23 to a regulated voltage U2. The voltage of the connection node P2 is negative. Assuming that resistance values of the second voltage-dividing resistor 23 and the input resistor 24 are respectively R1 and R2, then the current output via the voltage output port 202 is U2/(R1+R2).

Based on a virtual short principle and virtual open principle of the operational amplifier 10, a current flowing through the feedback output port 402 and the first feedback resistor 411 is equal to the current output via the voltage output port 202. That is, the current flowing through the feedback output port 402 and the first feedback resistor 411 also is U2/(R1+R2). Assuming a resistance value of the first feedback resistor 411 is Rf, then the voltage of the second output port 403 is U2*Rf/R1+R2.

Therefore, because the negative voltage U− is divided via the first voltage-dividing resistor 22, the second voltage-dividing resistor 23, and the input resistor 24, the voltage of the inverting input port 102 connected to the input resistor 24 is also negative. Thus, the voltage of the inverting input port 102 is less than the voltage of the non-inverting input port 101, and the first output port 12 of the operational amplifier 10 outputs a digital high signal.

The NMOSFET Q1 is turned on when the gate of the NMOSFET Q1 receives the digital high signal. The PMOSFET Q2 is turned off when the gate of the PMOSFET Q2 receives the digital high signal.

The protection circuit 60 establishes the connection between the first conduction port 602 and the second conduction port 603 when the power voltage Vcc is normal. Thus, the voltage output by the second output port 403 and the current output by the transmission port 302 are provided to the functioning parts 200 of the electronic device 2 via the power output port Vout. Therefore, in providing power, the power supply circuit 1 simulates a discharging process of a battery.

When the power output port Vout provides a voltage higher than the voltage output by the second output port 403, or provides a current higher than the current output by the transmission port 302, the power supply circuit 1 is charged. In detail, the power output port Vout provides current to the feedback circuit 40 and the current controlling circuit 30, the inverting input port 102 is at high voltage now. At this time, the voltage of the inverting input port 102 is higher than the voltage of the non-inverting port 101, and the operational amplifier 10 outputs a digital-low signal.

Thus, the gates of the NMOSFET Q1 and the PMOSFET Q2 receive the digital-low signal, the first NMOSFET Q1 is turned off accordingly and the PMOSFET Q2 is turned on accordingly. The current input by the power output port Vout is discharged to ground via the turned on PMOSFET Q2. Thus, the power supply circuit 1 also simulates a battery in accepting a battery recharging process.

In the embodiment, because the voltage output by the second output port 403 is U2*Rf/R1+R2, the voltage output by the second output port 403 can be adjusted by changing the resistance values of the second voltage-dividing resistor 23, the input resistor 24, or the first feedback resistor 411. In the embodiment, through using different NMOSFET Q1 and PMOSFET Q2, namely, using NMOSFET and PMOSFET with different attributes, the drain current is different and the current flowing through the power output port Vout also is different. Therefore, the power supply circuit 1 can simulate batteries with different voltages and currents.

In the embodiment, when the power supply circuit 1 is working, the self-excited high frequency signals of the inverting input port 102 and the first output port 12 are restrained by the high frequency restraining capacitor C.

In another embodiment, when the power supply circuit 1 only needs to simulate the process of a battery being discharged as power is provided, the second switch unit 32 can be omitted. Obviously, when the power voltage Vcc is stable, the protection circuit 60 also can be omitted.

It is understood that the present embodiments and their advantages will be understood from the foregoing description, and various changes may be made thereto without departing from the spirit and scope of the disclosure or sacrificing all of its material advantages, the examples hereinbefore described merely being exemplary embodiments of the present disclosure.

What is claimed is:

1. A power supply circuit, configured to power an electronic device with functioning parts, the power supply circuit comprising:
    a power output port configured to connect to the electronic device;
    an operational amplifier comprising a non-inverting input port, an inverting input port, and a first output port, wherein, the non-inverting input port is grounded;
    a voltage adjusting circuit connected to the inverting input port of the operational amplifier, configured to receive a reference voltage and convert the reference voltage to an operational signal, and provide the operational signal to the inverting input port of the operational amplifier, wherein, the operational amplifier outputs a corresponding electric signal according to the operational signal;
    a feedback circuit comprising a feedback input port, a feedback output port, and a second output port, wherein, the feedback input port is electrically connected to the first output port of the operational amplifier, the feedback output port is connected to the inverting input port of the operational amplifier, the second output port is electrically connected to the power output port, the feedback circuit being configured to output a power supply voltage to the power output port based on the operational signal output by the voltage adjusting circuit via the second output port; and
    a current controlling circuit comprising a control port and a transmission port, wherein the control port is connected to the first output port, the transmission port is electrically connected to the power output port; the current controlling circuit is configured to output a power supply current to the power output port according to the electric signal output by the first output port.

2. The power supply circuit according to claim 1, wherein the feedback circuit further comprises a first feedback resistor and a second feedback resistor connected between the feedback input port and the feedback output port in series, a first connection node of the first feedback resistor and the second feedback resistor constitutes the second output port.

3. The power supply circuit according to claim 2, wherein the feedback circuit further comprises a high frequency restraining circuit, the high frequency restraining circuit is electrically connected between the feedback input port and the feedback output port, the feedback circuit is configured to restrain self-excited high frequency signals of the feedback input port and the feedback output port.

4. The power supply circuit according to claim 1, wherein the current controlling circuit further comprises a first switch unit, the first switch unit comprises a first control terminal, a first input terminal, and a first output terminal, the first control terminal is electrically connected to the control port of the current controlling circuit, the first input terminal is connected to a first power voltage, the first output terminal is electrically connected to the transmission port of the current controlling circuit.

5. The power supply circuit according to claim 4, wherein the current controlling circuit further comprises a second switch unit, the second switch unit comprises a second control terminal, a second input terminal, and a second output terminal; the second control terminal is electrically connected to the control port, the second input terminal is electrically connected to the transmission port, and the second output terminal is grounded.

6. The power supply circuit according to claim 5, wherein the first switch unit and the second switch unit are turned on or off according to the electric signal output by the first output port; when the power supply circuit provides power to the electronic device, the first switch unit is turned on and the second switch unit is turned off, the first switch unit provides the power supply current to the transmission port, and then transmitted to the power output port; when the power supply circuit is powered, the first switch unit is turned off and the second switch unit is turned on, any current flowing through the transmission port is discharged to ground via the second switch unit which is turned on.

7. The power supply circuit according to claim 6, wherein the first switch unit is an NMOSFET, a gate, a source, and a drain of the NMOSFET respectively constitute the first control terminal, the first input terminal, and the first output terminal of the first switch unit; wherein the second switch unit is a PMOSFET, a gate, a source, and a drain of the PMOSFET respectively constitute the second control terminal, the second input terminal, and the second output terminal of the second switch unit.

8. The power supply circuit according to claim 1, wherein the voltage adjusting circuit comprises a voltage input port, a voltage output port, a voltage regulator diode, a first voltage-dividing resistor, a second voltage-dividing resistor, and an input resistor; the voltage input port receives the reference voltage, the voltage output port is connected to the inverting input port of the operational amplifier, a cathode of the voltage regulator diode is grounded, an anode of the voltage regulator diode is electrically connected to the voltage output port via the second voltage-dividing resistor and the input resistor, the first voltage-dividing resistor is connected between the anode of the voltage regulator diode and the voltage input port.

9. The power supply circuit according to claim 1, wherein, the voltage adjusting circuit provides negative voltage to the inverting input port of the operational amplifier when the power supply circuit provides power to the electronic device, wherein, the operational amplifier outputs a digital-high signal via the first output port when the inverting input port receives the regulated negative voltage.

10. The power supply circuit according to claim 1, wherein the operational amplifier further comprises a positive driving port and a negative driving port, the power supply circuit further comprises a driving circuit, the driving circuit is connected to the positive driving port, the negative driving port and a second power voltage, the driving circuit is configured to convert the second power voltage to a positive voltage and a negative voltage, and respectively provide the positive voltage and the negative voltage to the positive driving port and the negative driving port of the operational amplifier to drive the operational amplifier in working state.

11. The power supply circuit according to claim 10, wherein the driving circuit is a Buck-Boost conversion circuit, the positive voltage output by the driving circuit is greater than the second power voltage and the negative voltage output by the driving circuit is less than the second power voltage.

12. The power supply circuit according to claim 1, wherein the power supply circuit further comprises a protection circuit, the protection circuit is connected between the feedback circuit and the power output port, and is also connected between the current controlling circuit and the power output port.

13. The power supply circuit according to claim 12, wherein, the protection circuit comprises a voltage driving port, a first conduction port, and a second conduction port, the voltage driving port is electrically connected to a third power voltage, the first conduction port is connected to the second output port of the feedback circuit and the transmission port of the current controlling circuit, the second conduction port is electrically connected to the output port.

14. The power supply circuit according to claim 13, wherein, the protection circuit is configured to establish a connection between the first conduction port and the second conduction port, or to cut off the connection between the first conduction port and the second conduction port, according to state of the third power voltage.

* * * * *